United States Patent
Luo et al.

(10) Patent No.: US 12,435,126 B2
(45) Date of Patent: Oct. 7, 2025

(54) NANOBODY TARGETING INFLUENZA A VIRUS NUCLEOPROTEIN AND APPLICATION THEREOF, AND NUCLEIC ACID ENCODING NANOBODY

(71) Applicant: NANJING UNIVERSITY, Jiangsu (CN)

(72) Inventors: Yi Luo, Jiangsu (CN); Shixiang Yang, Jiangsu (CN); Wenjin Hu, Jiangsu (CN); Xiaolong Wang, Jiangsu (CN); Shengyang Wang, Jiangsu (CN); Huai Lin, Jiangsu (CN); Xiang Long, Jiangsu (CN)

(73) Assignee: NANJING UNIVERSITY, Jiangsu (CN)

( * ) Notice: Subject to any disclaimer, the term of this patent is extended or adjusted under 35 U.S.C. 154(b) by 0 days.

(21) Appl. No.: 18/965,925

(22) Filed: Dec. 2, 2024

(65) Prior Publication Data
US 2025/0197480 A1    Jun. 19, 2025

(30) Foreign Application Priority Data
Dec. 14, 2023    (CN) .......................... 202311715701.9

(51) Int. Cl.
*C07K 16/10*    (2006.01)
*G01N 33/569*   (2006.01)

(52) U.S. Cl.
CPC ... *C07K 16/1018* (2013.01); *G01N 33/56983* (2013.01); *C07K 2317/569* (2013.01); *G01N 2333/11* (2013.01)

(58) Field of Classification Search
None
See application file for complete search history.

(56) References Cited

FOREIGN PATENT DOCUMENTS

CN    117924470 A    *  4/2024    ........... C07K 16/005

OTHER PUBLICATIONS

Siebinga, et al. Arch Virol. 1988;100(1-2):75-87. doi: 10.1007/BF01310909. PMID: 2839132. (Year: 1988).*
Jiali Cao et al., "Nanobody-based sandwich reporter system for living cell sensing influenza A virus infection", Scientific Reports, vol. 9, Nov. 4, 2019, pp. 1-8.

* cited by examiner

*Primary Examiner* — Janet L Andres
*Assistant Examiner* — Jeffrey Mark Sifford
(74) *Attorney, Agent, or Firm* — JCIPRNET

(57) ABSTRACT

Disclosed are a nanobody targeting influenza A virus nucleoprotein and an application thereof, and a nucleic acid encoding the nanobody. The present disclosure obtains one nanobody targeting influenza A virus nucleoprotein through construction of a nanobody phage library and phage screening technology. The nanobody targeting influenza A virus nucleoprotein is a VHH antibody fragment having an amino acid sequence shown in SEQ ID NO:1-SEQ ID NO:2. The nanobody in the present disclosure can specifically bind to influenza A virus nucleoprotein, and can be applied to the detection and analysis of influenza A virus, and has broad application prospects in the fields of early warning of the epidemic or outbreak of influenza A virus, as well as the detection of influenza A virus in the environment or human body.

3 Claims, 1 Drawing Sheet
Specification includes a Sequence Listing.

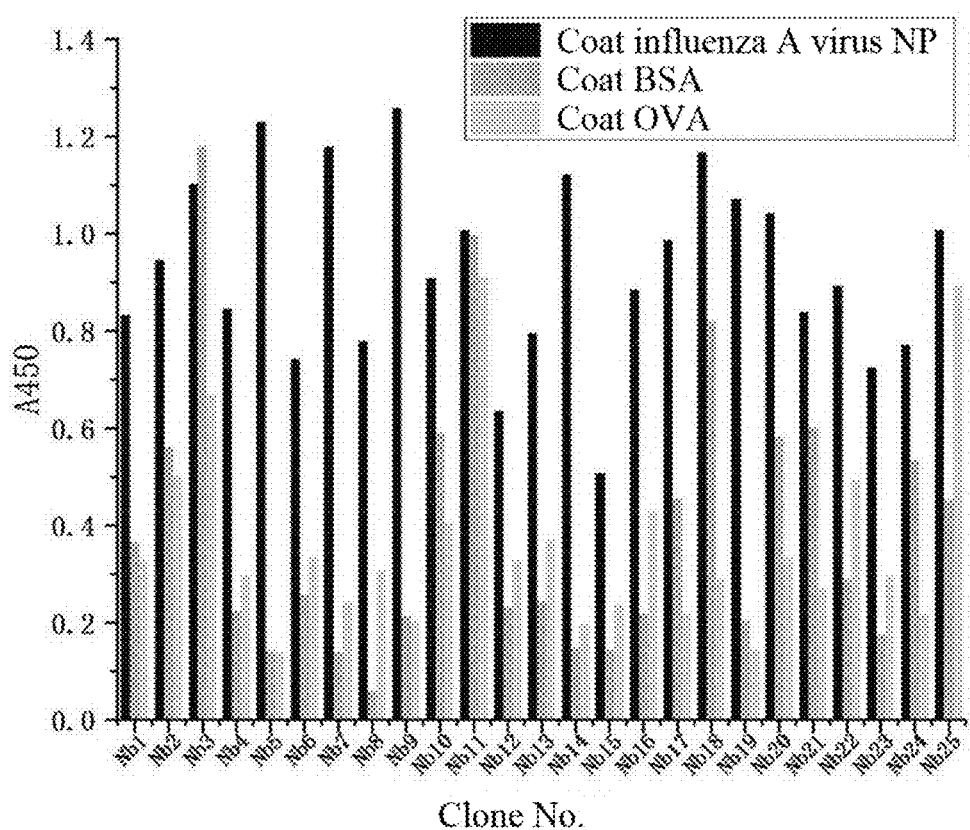

SEQUENCE LISTING

```
Sequence total quantity: 4
SEQ ID NO: 1            moltype = AA  length = 109
FEATURE                 Location/Qualifiers
source                  1..109
                        mol_type = protein
                        organism = synthetic construct
SEQUENCE: 1
LVQAGGSLRL SCAASGRTFI TLGMGWFRQA PGKEREFVAG ISWSGGSTRY SDSVKGRFTI  60
SRDNAKNTVY LQMNSLKPED TAVYYCAAGK SRSLMWTYWG QGTQVTVSS             109

SEQ ID NO: 2            moltype = AA  length = 106
FEATURE                 Location/Qualifiers
source                  1..106
                        mol_type = protein
                        organism = synthetic construct
SEQUENCE: 2
LVQAGGSLRL SCSTSGRTFN VGAMGWFRQA PGKEREFVAA VSLNFGRTYY ADSVKGRFTM  60
SRDNRKRSVY LQMNAMKPED TGVYYCAAGS STFRYWGQGT QVTVSS                106

SEQ ID NO: 3            moltype = DNA  length = 327
FEATURE                 Location/Qualifiers
source                  1..327
                        mol_type = other DNA
                        organism = synthetic construct
SEQUENCE: 3
ttggtccagg ctgggggctc tctgagactc tcctgtgcag cctctggacg caccttcatt  60
acgctcggca tgggctggtt ccgccaggct ccagggaagg agcgtgagtt tgtagcaggt  120
attagttgga gtggtggtag cacacgctat tcagactccg tgaagggccg attcaccatc  180
tccagagaca acgccaagaa cacggtgtat ctgcaaatga acagcctgaa acctgaggac  240
acggccgttt attattgtgc ggccgggaaa agtcgatccc taatgtggac gtactggggc  300
caggggaccc aagtcaccgt ctcctca                                      327
```

```
SEQ ID NO: 4           moltype = DNA  length = 318
FEATURE                Location/Qualifiers
source                 1..318
                       mol_type = other DNA
                       organism = synthetic construct
SEQUENCE: 4
ttggtgcagg ctgggggctc tctgagactc tcctgttcaa cctctggacg cacattcaat   60
gtcggagcca tgggctggtt ccgccaggct ccggggaagg agcgtgagtt tgttgcagcc  120
gtgtccttga attttgggcg cacatactac gcagactccg tgaagggccg attcaccatg  180
tccagagaca accgcaagcg ctcggtgtat ctgcaaatga acgccatgaa acctgaggac  240
acgggcgttt attactgtgc agctggtagt tctacgtttc gctactgggg ccaggggacc  300
caggtcaccg tctcctca                                                318
```

NANOBODY TARGETING INFLUENZA A VIRUS NUCLEOPROTEIN AND APPLICATION THEREOF, AND NUCLEIC ACID ENCODING NANOBODY

CROSS-REFERENCE TO RELATED APPLICATION

This application claims the priority benefit of China application serial no. 202311715701.9, filed on Dec. 14, 2023. The entirety of the above-mentioned patent application is hereby incorporated by reference herein and made a part of this specification.

REFERENCE TO A SEQUENCE LISTING

The instant application contains a Sequencing Listing which has been submitted electronically in XML file and is hereby incorporated by reference in its entirety. Said XML copy, created on Nov. 28, 2024, is named 151157-US-sequence listing and is 8,192 bytes in size.

BACKGROUND

Technical Field

The present disclosure relates to the technical field of biotechnology, and particularly relates to a preparation method and application of a nanobody targeting influenza A virus nucleoprotein.

Description of Related Art

Influenza is an acute respiratory infectious disease caused by influenza viruses. According to the World Health Organization, the influenza epidemics result in 3 to 5 million cases of severe illness, and 250,000 to 500,000 deaths around the world every year. People at greater risk of severe disease or death when pregnant women, infants, older people, healthcare workers, individuals with chronic medical conditions are infected with the influenza viruses (Cao, J., Zhong, N., Wang, G., et al.; *Nanobody-based Sandwich Reporter System for Living Cell Sensing Influenza A Virus Infection Sci Rep* 9, 15899 (2019)). Influenza viruses are members of the family Orthomyxoviridae, which includes three genera: influenza A, influenza B, and influenza C. Influenza virus is an enveloped single-stranded ribonucleic acid (RNA) with eight RNA segments, which are packaged in the form of viral ribonucleoprotein (vRNP) complexes. Each vRNP consists of viral nucleoprotein (NP) and viral RNA (vRNA), which forms a helical ring-like structure, and viral polymerase binds to 5' and 3' ends of the vRNA. Influenza virus nucleoprotein is a structural protein that encapsulates the viral RNA and plays a crucial role in the virus replication process. Unlike other influenza viral antigens, nucleoprotein is a highly conserved antigenic determinant. Therefore, the influenza virus nucleoprotein has become one of the signature targets for influenza virus detection. Antibodies targeting the conserved nucleoprotein epitope of influenza A virus are also often used in rapid diagnostics of influenza A.

At present, the primary methods for detecting influenza A are nucleic acid detection and immunoassay. Specifically, the nucleic acid detection is regarded as a "gold standard" due to its high accuracy and sensitivity. However, its application is limited by disadvantages such as time-consuming nature, complex operation, and cumbersome procedures. Therefore, in scenarios where nucleic acid testing is not feasible, there is an urgent need for a faster and simpler alternative method. Immunoassay has become an important means for detecting influenza A due to its advantages of easy operation, fast detection speed, and in-situ detection. Traditional monoclonal antibodies consist of heavy chains and light chains, and are the most commonly used detection elements in immunoassay. However, the monoclonal antibodies face the problems of high cost, poor stability, and difficulty in large-scale production, which restrict the application of monoclonal antibodies as immunoassay elements. Therefore, it is highly necessary to develop an alternative element to monoclonal antibodies.

Nanobodies refer to a heavy chain variable region of a heavy-chain antibody. Compared with traditional monoclonal antibodies, nanobodies are only 1/10 of traditional monoclonal antibodies in a size, and are capable of recognizing hidden epitopes that traditional monoclonal antibodies cannot access, and exhibit higher stability, lower large-scale production costs, and greater ease of modification. Currently, nanobodies have shown great potential in various biotechnology fields, such as pathogenic microorganism, human diagnostics, and treatment. Therefore, the development of a nanobody with high-sensitivity and strong-specificity targeting influenza A virus will have broad application prospects in the field of immunoassay.

SUMMARY

Based on the research background above, in order to overcome the deficiencies of traditional monoclonal antibodies, the present disclosure aims to develop a highly sensitive and specific nanobody to replace the traditional monoclonal antibodies, and apply the nanobody to various influenza A virus detection and analysis platforms.

In a first aspect, the present disclosure provides a nanobody targeting influenza A virus nucleoprotein, where the nanobody is a VHH antibody fragment having an amino acid sequence shown in SEQ ID NO: 1-SEQ ID NO:2. The nanobody exhibits excellent binding affinity and specificity with the influenza A virus nucleoprotein.

Further, the VHH antibody fragment has a nucleotide sequence shown in SEQ ID NO: 3-SEQ ID NO: 4.

In a second aspect, the present disclosure provides a preparation method of the nanobody targeting influenza A virus nucleoprotein, and the method includes the following step:

(1) transforming influenza A virus nucleoprotein (NP) expression plasmid into *Escherichia coli* BL21 (DE3) cells; using isopropyl-β-D-thiogalactoside (IPTG) after being cultured to a logarithmic growth phase to induce the expression of engineering bacteria, purifying the expressed influenza A virus NP by using a Ni-NAT gravity column to obtain high-purity protein, and identifying the influenza A virus NP by using sodium dodecyl sulfate polyacrylamide gel electrophoresis (SDS-PAGE) and enzyme-linked immunosorbent assay (ELISA);

(2) extracting lymphocytes from a non-immunized alpaca, and extracting a total RNA, synthesizing cDNA and using PCR to amplify a fragment encoding a VHH gene fragment; after digestion with a fast digestion, ligating the fragment into phagemid pComb3XSS using T4 ligase, introducing recombinant phagemid into *Escherichia coli* TG1 to construct a nanobody phage library, which has an estimated capacity of about 2×10$^{10}$ with low sequence redundancy and good diversity;

(3) coating the expressed influenza A virus NP onto an enzyme-linked immunosorbent assay plate, incubating for a period of time after inputting a recombinant phage, washing with PBST to remove the non-specifically bound recombinant phage, eluting with acid the specifically bound phage, amplifying the eluted phage, and determining a titer for a next round of panning or analysis; and performing 3-5 rounds of panning according to the steps of "adsorption-washing-elution-amplification", and carrying out panning progressively by changing conditions, such as a PBST concentration, and phage incubation time, during the panning to screen out the nanobody phage with higher affinity and stronger specificity; and (4) after several rounds of screening, randomly selecting 25 phages for Phage-ELISA identification, using influenza A virus NP, bovine serum albumin and ovalbumin as negative controls and PBS as blank controls; obtaining five recombinant phage-displayed nanobody with good specific binding to the influenza A virus NP, and amplifying the five phage-displayed nanobody, extracting plasmids thereof and sequencing to obtain two nanobodies.

Further, the influenza A virus NP in the present disclosure is produced via a prokaryotic expression system, and a pH value of an elution method ranges from 2 to 10.

Further, a construction method of a phage-displayed nanobody library is the present disclosure mainly includes the following steps:

(1) amplifying the gene fragment encoding the nanobody from alpaca lymphocytes, introducing Sfi I restriction sites at both ends of the nanobody; and (2) ligating the fragment into phagemid pComb3XSS and using T4 ligase to construct the phage-displayed library.

Further, a pH elution screening method mainly includes the following steps:

(1) coating 2.5-30 μg/mL of influenza A virus NP onto 400 μL ELISA wells at 4° C. for 10-14 h;

(2) washing the plate 5-10 times with 0.05-0.25% PBST, and blocking with bovine serum albumin (BSA) or ovalbumin (OVA) at 37° C. for 1-2 h;

(3) washing the plate 5-10 times with 0.05-0.25% PBST, adding 2×10$^{10}$ recombinant phage and incubating at 37° C. for 60-120 min; and (4) washing the plate 5-10 times with 0.05-0.25% PBST, adding 100-200 μL of 0.1M Gly-Hcl (pH=2.2) and incubating for 8-10 min, adding 30-45 μL of 1M Tris-Hcl (pH=9.1) to determine a titer, and picking monoclonal phages for Phage-ELISA identification.

In a third aspect, the present disclosure provides application of the nanobody targeting influenza A virus nucleoprotein, the phage-displayed nanobody can be specifically bound to the influenza A virus NP and used as a substitute for traditional monoclonal antibodies targeting the influenza A virus NP, and can be applied in the field of influenza A virus immunoassay.

The present disclosure has the following beneficial effects:

(1) Compared with the traditional monoclonal antibodies, the phage-displayed nanobody in the present disclosure has the advantages of small size, high stability, simple preparation, low cost, and large-scale production capability.

(2) Two nanobody sequences provided in the present disclosure is reported for the first time both at home and abroad, having great innovative achievements.

(3) The phage-displayed nanobody provided in the present disclosure can serve as core detection elements and be applied to various immunoassay platforms for detecting the influenza A viruses.

BRIEF DESCRIPTION OF THE DRAWINGS

The FIGURE shows results of Phage-ELISA verification of affinity and specificity of 1-25 phage-displayed nanobodies; and a horizontal axis indicates phage clone numbers, and a vertical axis indicates an absorbance value at 450 nm.

DESCRIPTION OF THE EMBODIMENTS

Material, reagents, and formulations used in the examples of the present disclosure are as follows:

Main Experimental Material:

Influenza A virus nucleoprotein (NP) plasmid, *Escherichia coli* BL21 (DE3), *Escherichia coli* TG1, a helper phage M13K07, and a phagemid pComb3XSS stored in the laboratory.

Main Reagents:

Ovalbumin and bovine serum albumin purchased from USA Sigma-Aldrich; horseradish peroxidase (HRP) enzyme-conjugated anti-M13 monoclonal antibody purchased from Sino Biological, Inc.; skim milk powder, 3,3', 5,5'-tetramethylbenzidine (TMB) chromogenic solution, and isopropyl-β-D-thiogalactoside (IPTG) purchased from Sangon Biotech (Shanghai) Co., Ltd.; and LB broth and 2×YT medium purchased from Qingdao Hi-Tech Industrial Park Hope Bio-Technology Co., Ltd.

Main Reagent Formulations:

1. 2×YT liquid medium: 31 g of 2×YT powder was weighed and dissolved in 1000 mL of ultrapure water and autoclaved at 121° C. for 15 min;

2. 2×YT solid medium: 31 g of 2×YT powder and 18 g of agar were weighed and dissolved in 1000 mL of ultrapure water and autoclaved at 121° C. for 15 min;

3. LB liquid medium: 25 g of LB medium was weighed and dissolved in 1000 mL of ultrapure water and autoclaved at 121° C. for 15 min;

4. 20% polyethylene glycol (PEG)-NaCl: 50 g of PEG-8000 and 36 g of NaCl were dissolved in ultrapure water by heating, then made up to a volume of 250 mL and autoclaved for 15 min;

5. Elution buffer: 0.2 M glycine (Gly) was prepared, hydrochloric acid was added to adjust a pH value to 2.2, and then autoclaved for 15 min; and 6. Neutralization buffer: hydrochloric acid was added to 1M tris(hydroxymethyl)aminomethane to adjust a pH value to 9.1, and then autoclaved for 15 min.

I. Prokaryotic Expression of Influenza A Virus Nucleoprotein (NP)

(1) BL21 (DE3) containing the influenza A virus nucleoprotein plasmid was streaked on an LB plate and incubated at 37° C. for 12-14 h;

(2) a single colony was picked from the plate and inoculated into 5 mL of LB medium, then incubated at 37° C. for 12-14 h;

(3) 500 μL of bacterial solution was taken and inoculated into 50 mL of LB medium, incubated at 37° C. for 3 h, and 0.1-0.5 M of IPTG was then added and incubated at 20° C. for 12-14 h;

(4) centrifugation was performed at 4000-8000 rpm for 10-20 min, bacterial pellet was taken and resuspended in PBS, and was then subjected to ultrasonic disruption at 200-300 W for 10-20 min; and (5) centrifugation was performed at 4000-8000 rpm for 10-20 min, supernatant was collected and purified by a Ni-NAT gravity column; and purity and activity of a purified product were identified by sodium dodecyl sulfate polyacrylamide gel electrophoresis (SDS-PAGE) and enzyme-linked immunosorbent assay (ELISA).

II. Construction of Natural Phage-Displayed Nanobody Library (1) peripheral blood lymphocytes were extracted from many alpacas;

(2) 1-2 mL of Trizol was added to the cells, 0.5-1 mL of isopropanol was added for inverting several times to mix evenly, and then placed at room temperature for 10-20 min;

(3) centrifugation was performed at 10,000-14,000 g for 10-20 min, and supernatant was discarded to obtain RNA pellet of the cells;

(4) 1-3 mL of 75% ethanol was added and inverted several times to mix evenly, placed at room temperature for 10 min, centrifugation was performed at 10,000-14,000 g for 10-20 min, and supernatant was discarded;

(5) inversion at room temperature was performed for 5-10 min for drying or a vacuum dry was performed, 25-50 μL of DEPC-ddH$_2$O was added to dissolve the RNA, RNA quality was detected by using gel electrophoresis, and concentration thereof was determined. The extracted RNA was subjected to reverse transcription using a reverse transcription kit to obtain a cDNA template;

(6) a VHH fragment/pComb3XSS digestion: 1-5 μg of VHH fragment/pComb3XSS, 20-140 μL of RNase-free H$_2$O, 1-2 μL of Sfi I fast digestion, 5-10 μL of fast digestion buffer, with reaction conditions of 37° C. for 45-60 min.

(7) a VHH fragment was cloned into phagemid pComb3XSS: 10-30 ng of a digested VHH fragment, 50-100 ng of pComb3XSS digestion, 0.8-1.2 μL of T4 ligase, 1-3 μL of T4 ligase buffer, and 7-14 μL of RNase free H$_2$O, with reaction conditions of 16° C. for 12-18 h;

(8) 100-200 ng of pComb3XSS-VHH recombinant phagemid was transformed into competent *E. coli* TG1 and incubated at 37° C. for 10-14 h; and all single colonies were eluted from the plate to constitute a phage nanobody library;

(9) 50-100 μL of eluted phage library was taken and inoculated into 5 mL of 2×YT/ampicillin (Amp) medium; when the culture medium was grown to a logarithmic growth phase, a helper phage M13K07 was added at an inflection ratio of *E. coli*:phage=1:20, and then incubated at 37° C. for 1 h;

(10) the above 5 mL of culture system was totally added into 50 mL of 2×YT/Amp/Kanamycin (Kana) medium and incubated at 37° C. for 12 h;

(11) centrifugation was performed at 12,000-16,000 g for 10-15 min, supernatant was collected, 12 mL of PEG/NaCl was added to the supernatant to obtain a mixture, and the mixture was left on ice for 4-6 h;

(12) centrifugation was performed at 12,000-16,000 g for 30-40 min, supernatant was discarded, 1 mL of PBS was added to resuspend, 200-300 μL of PEG/NaCl was added to obtain a mixture, and the mixture was left on ice for 1-2 h; and

(13) centrifugation was performed at 12,000-16,000 g for 30-40 min, supernatant was discarded, 200-300 μL of PBS was added to resuspend, 10 μL of phage was taken to determine a recombinant phage titer, which can reach up to $2\times10^{10}$, and the phage was aliquoted for later screening.

III. Screening of Phage-Displayed Nucleoprotein (NP) Against Influenza A Virus (1) In an ultra-clean workbench, an ELISA plate was washed 3-5 times with sterile water, and then sterilized under UV light for 60-75 min;

(2) influenza A virus NP was diluted with PBS to a final concentration of 2.5-30 μg/mL, the diluted influenza A virus NP was added to the ELISA plate at 100-200 μL per well, and coated at 4° C. for 10-14 h;

(3) the plate was washed 5 times with PBS and then patted dry with sterile paper, and 250-350 μL of 1-3% BSA-PBS blocking solution was added to each well for blocking at 37° C. for 2 h;

(4) the plate was washed 5 times with PBS and then patted dry with sterile paper, and $2\times10^{10}$ recombinant phage library was taken and mixed with 150-200 μL of PBS, then added to the ELISA plate for binding at 37° C. for 60-120 min;

(5) the plate was washed 5 times with 0.1% PBST and then patted dry with sterile paper, 100 μL of Gly-HCl buffer was added and incubated at 37° C. for 8-10 min, an eluted product was aspirated, and 30-45 μL of Tris-HCl buffer was added quickly; and (6) 10 μL of phage was taken for gradient dilution, an eluted phage titer was determined, a panning recovery rate was calculated, the remaining phage was amplified and purified for a next round of screening or analysis; and The amplification steps are the same as those for construction of the phage-displayed nanobody library against influenza A virus NP; and (7) The steps (1) to (6) were a first round of amplification, and a panning steps for second to fifth rounds were basically the same, an amount of phage input for each round was $2\times10^{10}$ pfu per well, a coating concentration of the influenza A virus NP was decreased from 30 μg/mL down to 2.5 μg/mL in each round, 1-3% OVA-PBS and 1-3% BSA-PBS blocking solutions were used for alternating blocking, a binding time of the phage input and the influenza A virus nucleoprotein was 120-30 min, and an elution buffer concentration ranged from 0.05% to 0.25% PBST. The panning scheme was shown in Table 1.

TABLE 1

Panning process for phage-displayed nanobody against influenza A virus NP

| Round | NP coating concentration | Blocking solution | Phage volume | Elution buffer | Incubation time |
|---|---|---|---|---|---|
| I | 30 | BSA-PBS | $2\times10^{10}$ | 0.05% PBST | 120 min |
| II | 15 | OVA-PBS | $2\times10^{10}$ | 0.05% PBST | 90 min |
| III | 10 | BSA-PBS | $2\times10^{10}$ | 0.1% PBST | 60 min |
| IV | 5 | OVA-PBS | $2\times10^{10}$ | 0.25% PBST | 45 min |
| V | 2.5 | BSA-PBS | $2\times10^{10}$ | 0.25% PBST | 30 min |

3. Screening and Identification of Specific Phage Clone

After five rounds of screening were completed, single colonies of 25 phage-displayed nanobodies were selected for amplification and identification by phage-ELISA. The specific steps were as follows:

(1) 25 single colony clones were picked and inoculated into 1 mL of 2×YT/Amp liquid medium and cultured at 37° C., 220 rpm for 12-14 h;

(2) 100-150 μL of the above culture was taken and added to 1 mL of 2×YT/Amp liquid medium, mixed thoroughly and shaken at 220 rpm for 2-3 h until a logarithmic growth phase;

(3) the helper phage M13K07 was added to each tube at a ratio of cell:phage=1:1, and incubated at 37° C. for 15-20 min, and incubated with shaking at 220 rpm for 30-45 min;

(4) centrifugation was performed at 4° C. at 8000-10000 rpm for 2-5 min, 1-1.5 mL of 2×YT/Amp/Kana was added to resuspend, and incubated at 37° C. with shaking at 250 rpm for 10-14 h;

(5) after the incubation, centrifugation was performed 8,000-10,000 rpm for 10-12 min, supernatant was aspirated and transferred into a sterile centrifuge tube, labeled and marked, and then stored at 4° C. for ELISA identification;

(6) 100-200 μL of influenza A virus NP, bovine serum albumin and ovalbumin with a concentration of 1-5 μg/mL were taken from each well, and coated onto the ELISA plate at 4° C. for 10-14 h;

(7) the coating solution was discarded, the plate was washed three times with 0.05% PBST, and 250-350 μL of 3-5% skim milk powder was added to each well and incubated at 37° C. for 2-3 h;

(8) the plate was washed three times with 0.05% PBST, and 100 μL of the panned phage supernatant culture was added to each well coated with the influenza A virus NP, bovine serum albumin and ovalbumin, and then incubated at 37° C. for 45-60 min;

(9) the plate was washed six times with 0.05% PBST, 100-200 μL of anti-M13 secondary antibody was added to each well and incubated at 37° C. for 45-60 min;

(10) the plate was washed seven times with 0.05% PBST, 100 μL of TMB chromogenic solution was added and incubated at 37° C. for 10-15 min, 50 μL of 1M $H_2SO_4$ was added to each well, and A 450 nm was measured. The FIGURE shows binding capability of the selected 25 recombinant phage clones with the influenza A virus NP, bovine serum albumin and ovalbumin. A horizontal axis indicates phage clone numbers, and a vertical axis indicates a absorbance value at 450 nm; and

(11) among the 25 selected clones, all of the 25 clones were capable of being bound to the influenza A virus NP; where clones Nb5, Nb7, Nb9, Nb14 and Nb19 exhibited strong binding capability and specificity with the influenza A virus NP, the five clones were amplified and sequenced using designed primers, and two phage-displayed nanobody amino acid sequences with different sequences was obtained through analysis.

Specific application of the present disclosure: the present disclosure particularly relates to a phage-displayed nanobody capable of binding to the influenza A virus NP, which can express a nanobody corresponding to the amino acid via in vitro protein expression technology, and can be utilized as a detection element for influenza A virus in analytical systems such as enzyme-linked immunosorbent assay, immunochromatography test strip and immunosensor, and the development of detection kits.

The above examples describe the implementation methods of the present disclosure. Those skilled in the art may make various applications and improvements without departing from the spirit of the present disclosure, all of which fall within the scope of protection of the present disclosure.

---

What is claimed is:

1. A nanobody targeting influenza A virus nucleoprotein, wherein the nanobody is a VHH antibody, and the nanobody has an amino acid sequence shown in SEQ ID NO:1 or SEQ ID NO:2.

2. A nucleic acid encoding the nanobody targeting influenza A virus nucleoprotein according to claim 1, wherein a nucleotide sequence of the nucleic acid is shown in SEQ ID NO:3 or SEQ ID NO:4.

3. An application of the nanobody targeting influenza A virus nucleoprotein according to claim 1, wherein the nanobody is applied in preparation of an influenza A virus detection kit.

* * * * *